US011350511B2

(12) United States Patent
Scholer et al.

(10) Patent No.: US 11,350,511 B2
(45) Date of Patent: May 31, 2022

(54) FIBER REINFORCED SYSTEMS WITH ELECTROSTATIC DISSIPATION

(71) Applicant: HJ3 COMPOSITE TECHNOLOGIES, LLC, Tucson, AZ (US)

(72) Inventors: Olley C. Scholer, Tucson, AZ (US); James J. Butler, Tucson, AZ (US)

(73) Assignee: HJ3 COMPOSITE TECHNOLOGIES, LLC, Tucson, AZ (US)

( * ) Notice: Subject to any disclaimer, the term of this patent is extended or adjusted under 35 U.S.C. 154(b) by 354 days.

(21) Appl. No.: 16/347,786

(22) PCT Filed: Nov. 7, 2017

(86) PCT No.: PCT/US2017/060407
§ 371 (c)(1),
(2) Date: May 6, 2019

(87) PCT Pub. No.: WO2018/085839
PCT Pub. Date: May 11, 2018

(65) Prior Publication Data
US 2019/0297716 A1 Sep. 26, 2019

Related U.S. Application Data

(60) Provisional application No. 62/418,600, filed on Nov. 7, 2016.

(51) Int. Cl.
| | |
|---|---|
| *H05F 3/02* | (2006.01) |
| *B29C 70/88* | (2006.01) |
| *B32B 15/02* | (2006.01) |
| *B32B 15/08* | (2006.01) |
| *B32B 15/14* | (2006.01) |
| *B64D 37/32* | (2006.01) |
| *B64D 45/02* | (2006.01) |

(Continued)

(52) U.S. Cl.
CPC ............... *H05F 3/02* (2013.01); *B29C 65/48* (2013.01); *B29C 70/885* (2013.01); *B32B 3/02* (2013.01); *B32B 5/06* (2013.01); *B32B 15/02* (2013.01); *B32B 15/08* (2013.01); *B32B 15/14* (2013.01); *B32B 37/24* (2013.01); *B64D 37/32* (2013.01); *B64D 45/02* (2013.01); *B29L 2031/3406* (2013.01); *B32B 2037/243* (2013.01);

(Continued)

(58) Field of Classification Search
CPC ........... H05F 3/02; B64D 45/02; B32B 15/02; B29C 70/885
See application file for complete search history.

(56) References Cited

U.S. PATENT DOCUMENTS 2,961,738 A 11/1960 Thomas
3,620,701 A 11/1971 Janetos et al.
(Continued)

OTHER PUBLICATIONS

International Search Report for PCT Application No. PCT/US17/60407 dated Jan. 12, 2018.

*Primary Examiner* — Scott W Dodds
(74) *Attorney, Agent, or Firm* — Nguyen Tarbet LLC

(57) ABSTRACT

Systems and methods of forming fiber reinforced polymer (FRP) composites with electrostatic dissipative properties are described herein. The FRP composite is bonded to a surface and integrates a grounding system to dissipate electro-static energy, thus eliminating the potential risk of explosion. The system can be used for structures that require reinforcement and that are susceptible to electro-static explosions.

1 Claim, 5 Drawing Sheets

(51) Int. Cl.
   *B32B 5/06*    (2006.01)
   *B32B 3/02*    (2006.01)
   *B32B 37/24*   (2006.01)
   *B29C 65/48*   (2006.01)
   *B29L 31/34*   (2006.01)
(52) U.S. Cl.
   CPC ....... *B32B 2255/02* (2013.01); *B32B 2255/26* (2013.01); *B32B 2305/188* (2013.01); *B32B 2307/202* (2013.01); *B32B 2307/21* (2013.01); *B32B 2457/00* (2013.01)

(56) References Cited

U.S. PATENT DOCUMENTS

| | | |
|---|---|---|
| 3,903,714 A | 9/1975 | Horeni et al. |
| 3,989,984 A * | 11/1976 | Amason ................ B29C 70/885 361/212 |
| 4,052,866 A | 10/1977 | Saunders |
| 4,079,568 A | 3/1978 | Wortman |
| 4,931,345 A | 6/1990 | Bottger et al. |
| 5,118,569 A | 6/1992 | Kuroda et al. |
| 5,180,885 A | 1/1993 | Shah |
| 5,198,280 A | 3/1993 | Harpell et al. |
| 5,232,775 A | 8/1993 | Chamberlain et al. |
| 5,640,825 A | 6/1997 | Ehsani et al. |
| 6,843,194 B1 | 1/2005 | Baudet |
| 8,696,849 B2 | 4/2014 | Butler |
| 8,980,770 B2 | 3/2015 | Cawse et al. |
| 9,307,796 B2 | 4/2016 | Butler |
| 9,994,981 B2 | 6/2018 | Butler |
| 2012/0159760 A1 * | 6/2012 | Butler .................... A41D 27/20 29/402.09 |
| 2015/0195897 A1 | 7/2015 | Swift et al. |
| 2018/0050817 A1 * | 2/2018 | Le .......................... B64D 45/02 |

* cited by examiner

FIBER REINFORCED SYSTEMS WITH ELECTROSTATIC DISSIPATION

CROSS REFERENCE

This application is a 371 and claims benefit of PCT/US17/60407 filed Nov. 7, 2017, which claims benefit of U.S. Provisional Application No. 62/418,600 filed Nov. 7, 2016, the specification of which is incorporated herein by reference in its entirety.

FIELD OF THE INVENTION

The present invention relates to a fiber reinforced polymer (FRP) systems with electrostatic dissipative (ESD) properties, and methods of using said systems on various substrates.

BACKGROUND OF THE INVENTION

Explosions can occur when fuel sources such as gas, vapors, mists, or dusts are ignited from sources like static electricity. Infrastructure assets that operate in these conditions are typically designed in accordance with NFPA 69: Standard on Explosion Prevention Systems. Currently, conductive coatings with ESD capabilities are applied as a secondary coating on existing surfaces to dissipate static. Said surfaces may be part of non-structural systems, such as electronic equipment, or flooring and flooring materials, such as concrete surfaces, tiles, carpet, and floor mats. However, these ESD coatings are used typically used for non-structural systems, but have not been applied to primary structural systems.

These structures, such as walls and pillars, often require repairs that can be installed using "cold" or non-welded solutions. Until now, composite repair systems cannot dissipate the static electricity that can build up during operations. Composites are natural insulators and therefore can hold accumulate static. The release of static can ignite combustible dust, which will create significant asset damage, and may result in loss of lives. This invention imparts ESD properties in fiber reinforced polymer composites designed for structural reinforcement, which allows for static to dissipate to ground via the ESD properties that would be in contact with static accumulation, thereby preventing loss of lives and protecting assets in environments where static electricity can ignite combustible dusts.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide for a non-welded repair solution that can strengthen and reinforce a structure as well as dissipate static electricity to a structure's grounding source. It is a further objective of the invention to restore structural integrity to a critical asset and maintain NFPA 69 compliance. Thus, in one aspect, the present invention features a system comprising a fiber reinforced polymer (FRP) composite, a conductive filler material disposed in the FRP composite, a conductive network in contact with or disposed within the FRP composite, and a grounding component connected to the conductive network.

In some aspects, the present invention features a fiber reinforced polymer (FRP) system having a conductive filler material, which can decrease the ohm's resistance of said system in the insulate range of about $\geq 1.0 \times 10^{11}$ ohms. Said conductive filler material is embedded within the structural reinforcing FRPs of the invention and then tied to a grounding source, thus achieving electrostatic dissipation (ESD). This allows for static to dissipate to conductive copper strips, or other equivalent conductive or metallic material, which then transfers the static to a grounding source, thereby rendering it harmless for ignition. The invention can be designed for strengthening a structure to withstand explosions Class A rating for ASTM E84 Flame & Smoke Spread Index System, and can be further designed for up to a 3-hour fire resistance rating per ASTM E119. None of the presently known prior references or work has the unique inventive technical feature of the present invention. Current ESD materials in the art have not been applied to primary structural systems; instead, they are typically in the form of ESD coatings used for non-structural systems.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1:
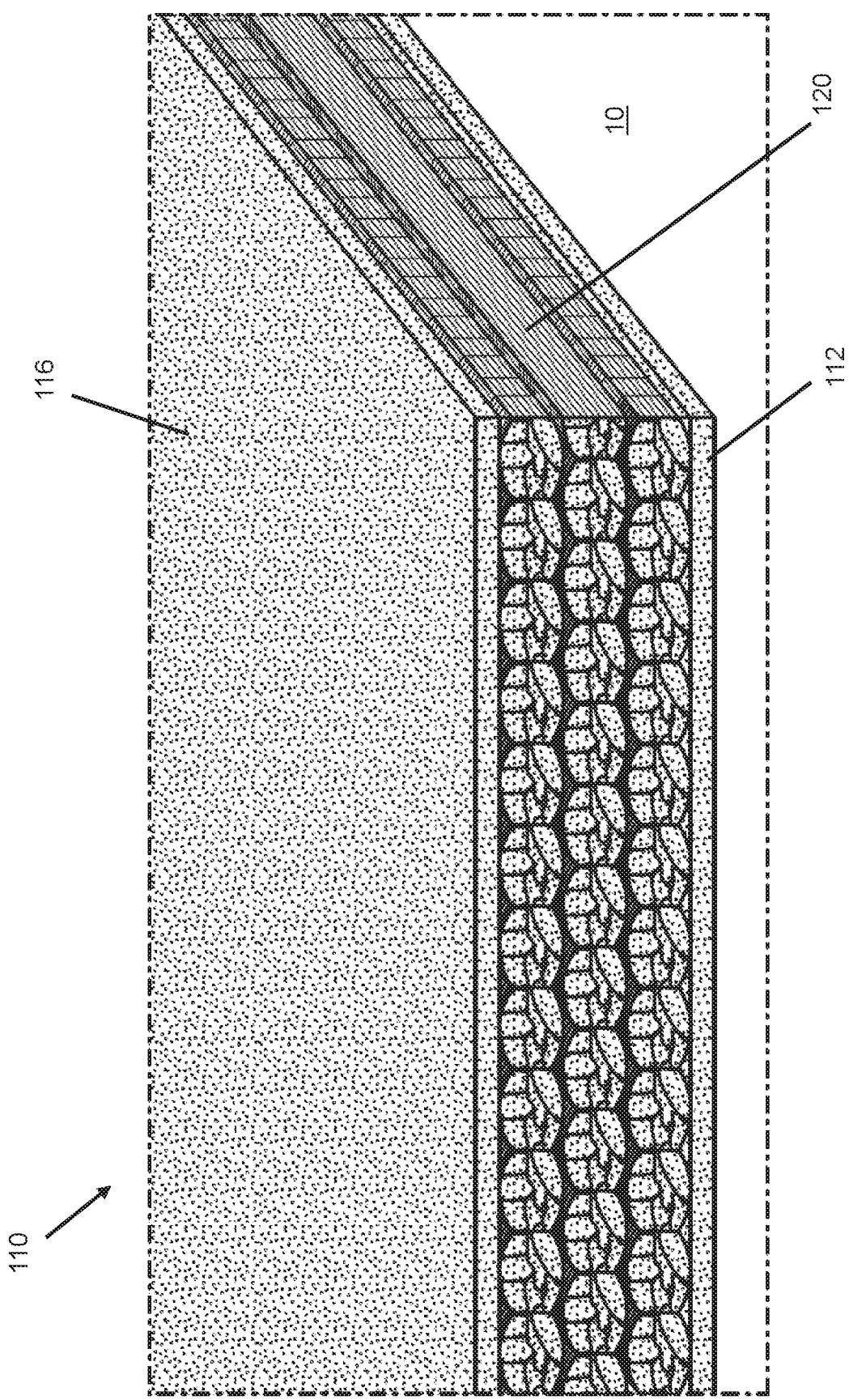
FIG. 1 shows a non-limiting embodiment of a fiber reinforced polymer (FRP) composite of the present invention.
Figure 2:
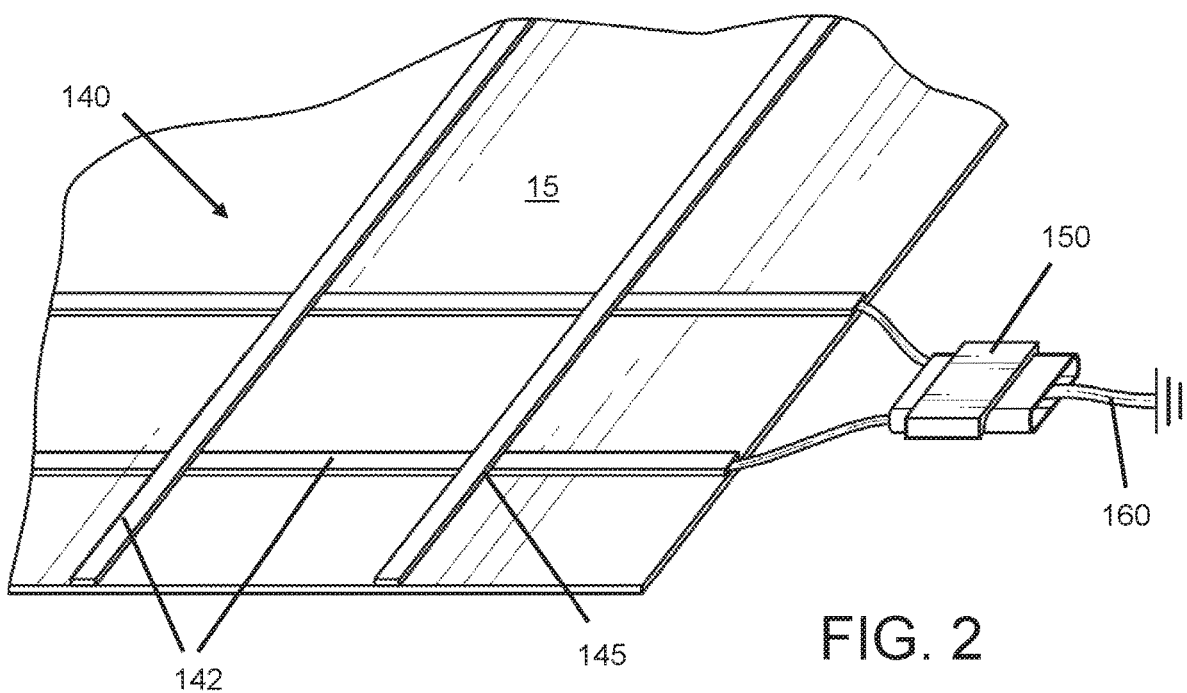
FIG. 2 shows a non-limiting example of a conducting network disposed on a surface of a structure or on a layer of an FRP composite.
Figure 3:
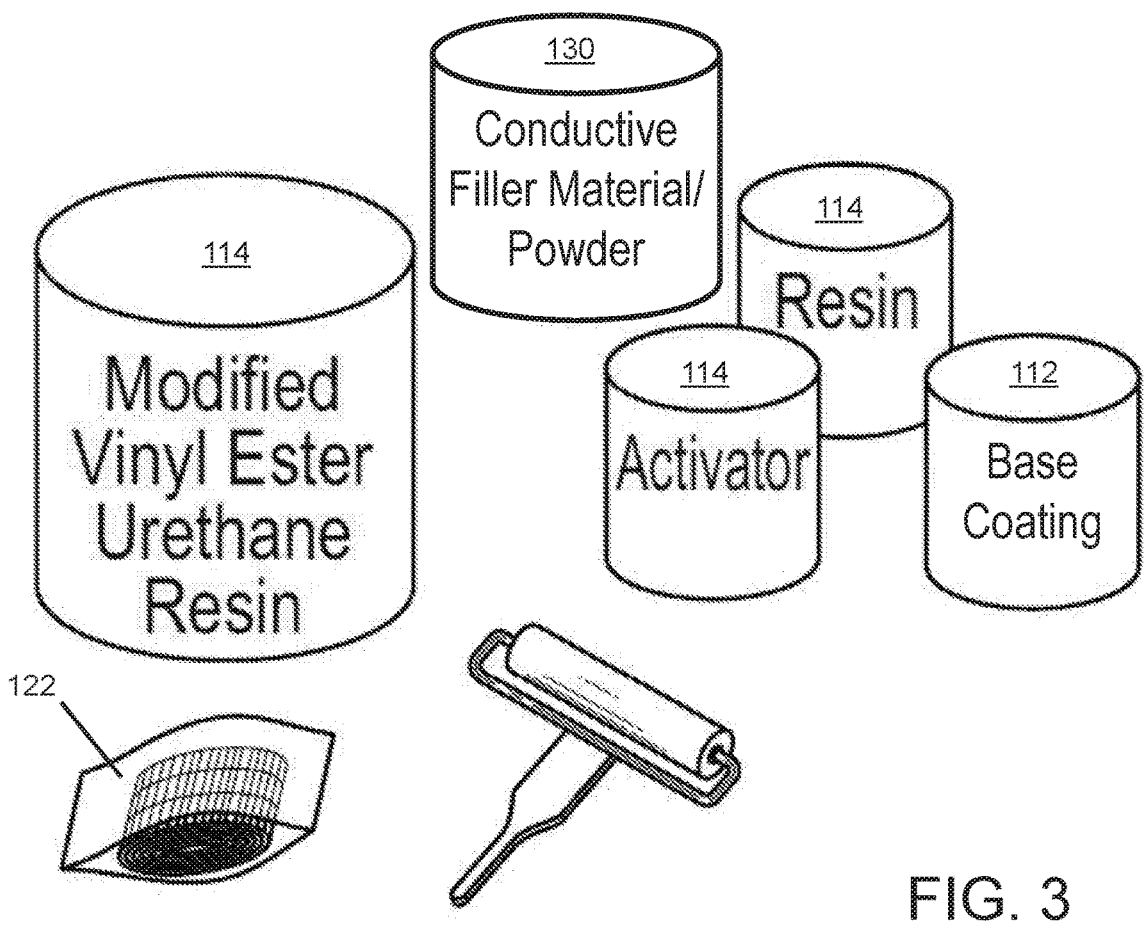
FIG. 3 shows a non-limiting embodiment of a reinforcing and electrostatic dissipative (ESD) composite system of the present invention

Following is a list of elements corresponding to a particular element referred to herein:
  10 structure
  15 surface of structure
  100 reinforcing and electrostatic dissipative (ESD) composite system
  110 fiber reinforced polymer (FRP) composite
  112 base coating
  114 polymer resin composition
  116 top coating
  120 reinforcing ply stack
  122 reinforcing fabric ply
  124 pocket
  125 pocket seam edge
  126 fiber tow
  128 filaments
  130 conductive filler material
  140 conductive network 142 conductive wiring or tape
144 conductive thread
145 grid pattern
150 connection clip
160 grounding component Dissipative materials allow the charges to flow to ground more slowly in a more controlled manner than with conductive materials. Materials considered to be static dissipative have a surface resistance of $1.0\times10^4$ ohms to $<1.0\times10^{11}$ ohms and allow for dissipation of electrical charges generally within milliseconds.

In some embodiments, the fiber reinforced polymer (FRP) of the present invention may be according to the systems described in U.S. Pat. Nos. 8,696,849 and 9,307,796 of Butler, the specifications of which are incorporated herein by reference. Briefly, U.S. Pat. Nos. 8,696,849 and 9,307,796 teach novel reinforcement systems for maximizing tensile strength and modulus of elasticity per ply for composite systems. A ply of reinforcement fabric has a first fabric edge seam that traverses and binds the fabric parallel and adjacent to a first fabric edge, and a second fabric edge seam that traverses and binds the fabric parallel to and adjacent to a second fabric edge. The first and second fabric edges traverse the fabric in the direction of an X-axis (0 degrees). The fabric may have one or more pockets with a first pocket edge, a second pocket edge, a pocket front surface, and a pocket rear surface. The pocket front surface and the pocket rear surface each have a pocket cross-stitch that perpendicularly traverses the pocket. A first pocket seam has stitching in a plane defined by the X-axis (0 degrees) and a Z-axis alternatingly attaching the pocket front surface to the pocket rear surface via the stitching. The pocket traverses the fabric parallel and adjacent to the first fabric edge and the second fabric edge in a warp, or 0 degree, or x-axis direction. The pockets contain one or more fiber tows with a plurality of filaments in a stack.

Referring now to FIGS. 1-5B, the present invention features a reinforcing and electrostatic dissipative (ESD) composite system (100) comprising a fiber reinforced polymer (FRP) composite (110), a conductive filler material (130), a conductive network (140) of wires or tape, and a grounding wire (160) connected to the conductive network (140) via a connection clip (150). In some embodiments, the fiber reinforced polymer (FRP) composite (110) may comprise a base coating (112) configured to be applied on a surface (15) of a structure (10), a reinforcing ply stack (120) disposed on the base coating (112), a polymer resin composition (114) applied on the ply stack (120) and saturating each fabric ply (122), and a top coating (116) disposed on the saturated ply stack (120). In other embodiments, the ply stack (120) may comprise one or more reinforcing fabric plies (122), each fabric ply (122) being layered atop another fabric ply (122) to form the ply stack (120). Each fabric ply (122) may comprise a plurality of linear pockets (124) aligned in parallel, where each pocket (124) is stitched lengthwise to its neighboring pockets (124) at a pocket seam edge (125), and a fiber tow (126) comprising a plurality of filaments (128) collected into a bundle, and being disposed lengthwise in each pocket (124). In one embodiment, the conductive filler material (130) may be disposed, e.g. embedded, in the top coating (116) of the FRP composite. In another embodiment, the conductive network (140) of wires or tape may be juxtaposed between the saturated ply stack (120) and the top coating (116) with the conductive filler material (130).

According to another embodiment of the present invention, the system (100) may comprise a fiber reinforced polymer (FRP) composite (110), a conductive filler material (130) disposed in the FRP composite (110), a conductive network (140) of wires or tape in contact with or disposed within the FRP composite (110), and a grounding component (160) connected to the conductive network (140). In some embodiments, the FRP composite (110) may comprise a base coating (112) configured to be applied on a surface (15) of the structure (10), a reinforcing ply stack (120) disposed on the base coating (112) and comprising one or more reinforcing fabric plies (122) being layered atop each other to form the ply stack (120), a polymer resin composition (114) applied on the ply stack (120) and saturating each fabric ply (122), and a top coating (116) disposed on the saturated ply stack (120). In other embodiments, each fabric ply (122) may comprise a plurality of linear pockets (124) aligned in parallel, with each pocket (124) being stitched lengthwise to its neighboring pockets (124) at a pocket seam edge (125), and a fiber tow (126) comprising a plurality of filaments (128) collected into a bundle and disposed lengthwise in each pocket (124).

Without wishing to bind the invention to a particular theory or mechanism, when any system (100) is disposed on the surface of structure, the FRP composite (110) may be effective for reinforcing the structure (10). Further still, the conductive filler material (130) may be effective for dissipating static from the structure (10) and the FRP composite (110) to the grounding wire (160) via the conductive network (140), thereby reducing a risk of static ignition. Preferably, the system (100) can have a resistivity in a static dissipative range of about $1.0\times10^4$ to $<1.0\times10^{11}$ ohms, per ANSI ESD S541 Resistance Classification, which falls in the static dissipating range.

In one embodiment, the base coating (112) may comprise a primer component applied on the surface of the structure, and a base component applied on the primer component. In another embodiment, the polymer resin composition (114) may comprise a resin component and an activation component. In some embodiments, the resin component may be any thermosetting polymer including, but not limited to, epoxies, urethanes, vinyl esters, and phenol formaldehyde resins such as novolac. In other embodiments, the activation component may be a hardener or catalyst. In further embodiments, the top coating (116) may be any thermosetting polymer.

In still another embodiment, the pockets (124) and filaments (128) may be constructed from polyethylene, glass, basalt, aramid, and carbon. In some embodiments, the fiber tow has about 1-3,000 filaments. In other embodiments, the fiber tow has about 3,000-6,000 filaments, or about 6,000-12,000 filaments, or about 12,000-50,000 filaments. In further embodiments, the fiber tow has more than about 50,000 filaments, or more than about 100,000 filaments, or more than about 400,000 filaments. In further embodiments, the filaments may be non-interlaced filaments, interlaced filaments, non-twisted filaments, or twisted filaments.

In some embodiments, the cross-sectional area of the filament bundle is about 50% to 70% of the cross-sectional area of the pocket. In other embodiments, the cross-sectional area of the filament bundle is about 70% to 85% of the cross-sectional area of the pocket. In further embodiments, the cross-sectional area of the filament bundle is about 85% to 99.5% of the cross-sectional area of the pocket.

In some embodiments, the volume of the filament bundle is about 50% to 70% of the volume of the pocket. In other embodiments, the volume of the filament bundle is about 70% to 85% of the volume of the pocket. In further embodiments, the volume of the filament bundle is about 85% to 99.5% of the volume of the pocket.

In one embodiment, the conductive filler material (130) may be in the form of a powder. Non-limiting examples of the conductive filler material (130) include graphite, carbon fiber, carbon powder, carbon nanotubes, and metallic powder. In another embodiment, the grounding component (160) may be constructed from a conductive material such as copper, silver, gold, or alloys thereof. In some embodiments, the grounding component (160) may comprise at least one ground wire that is connected to the conductive network (140) via the connection clip (150). In other embodiments, the ground wires or ties, which are attached to the conductive metal strips, can be configured such that one grounding wire extends from a first outer edge of the system, and another wire extends from an opposing outer edge.

In some embodiments, the conductive filler material (130) may be mixed with at least one of the base coating (112), the polymer resin composition (114), or the top coating (116) to form an ESD layer. The ESD layer may comprise about 5%-70% vol of the conductive filler material (130). For example, the ESD layer may comprise about 5%-15% vol of the conductive filler material (130), or about 10%-25% vol of the conductive filler material (130), or about 20%-40% vol of the conductive filler material (130), or about 30%-50% vol of the conductive filler material (130), or about 40%-60% vol of the conductive filler material (130), or about 50%-70% vol of the conductive filler material (130).

Figure 4A:
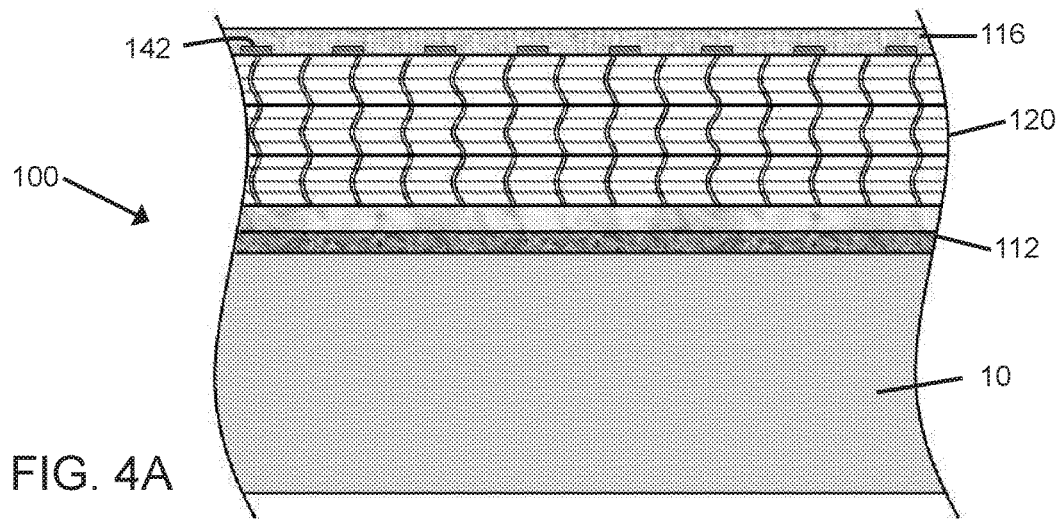
FIGS. 4A-4F show cross-sectional views of non-limiting embodiments of the FRP composite in which the conducting network is located in different layers of the FRP composite.
Figure 4B:
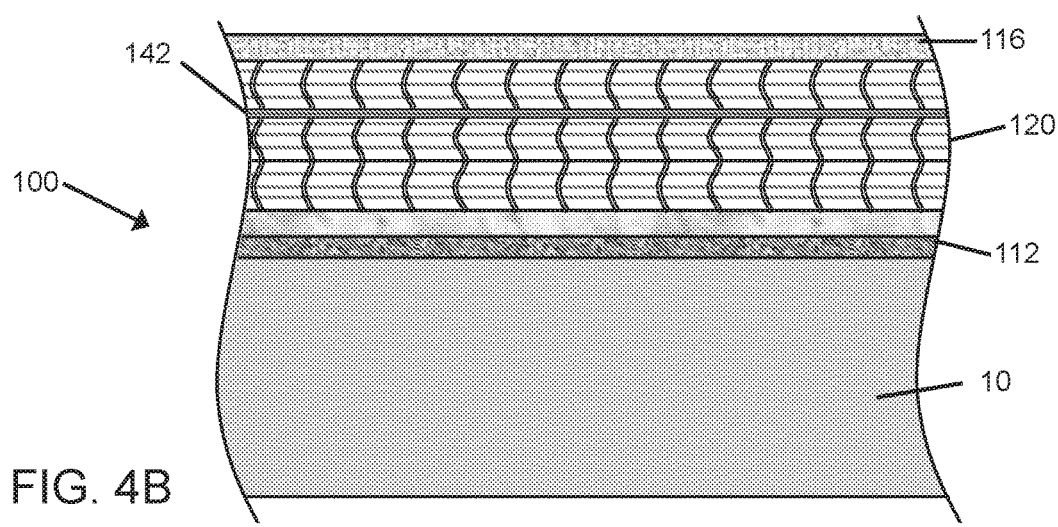
Figure 4C:
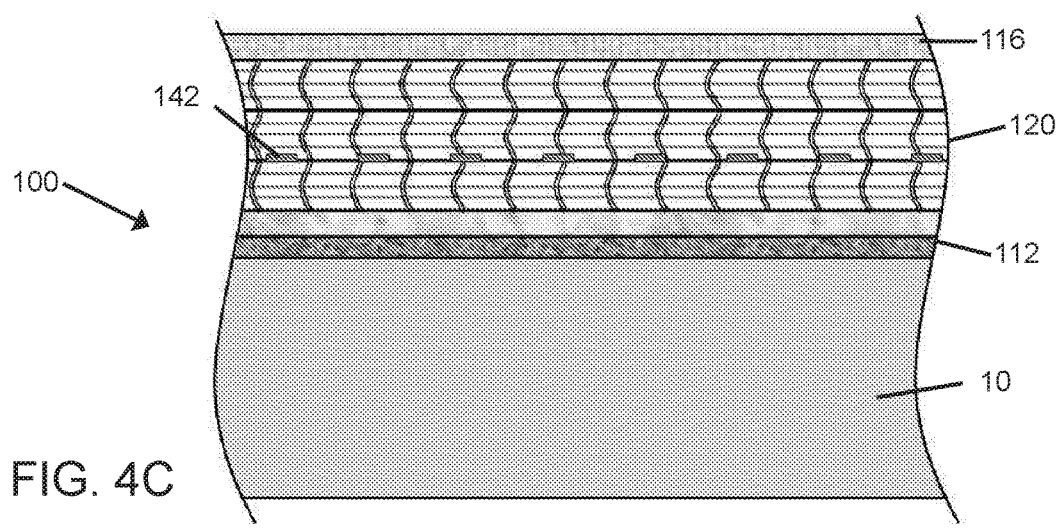
Figure 4D:
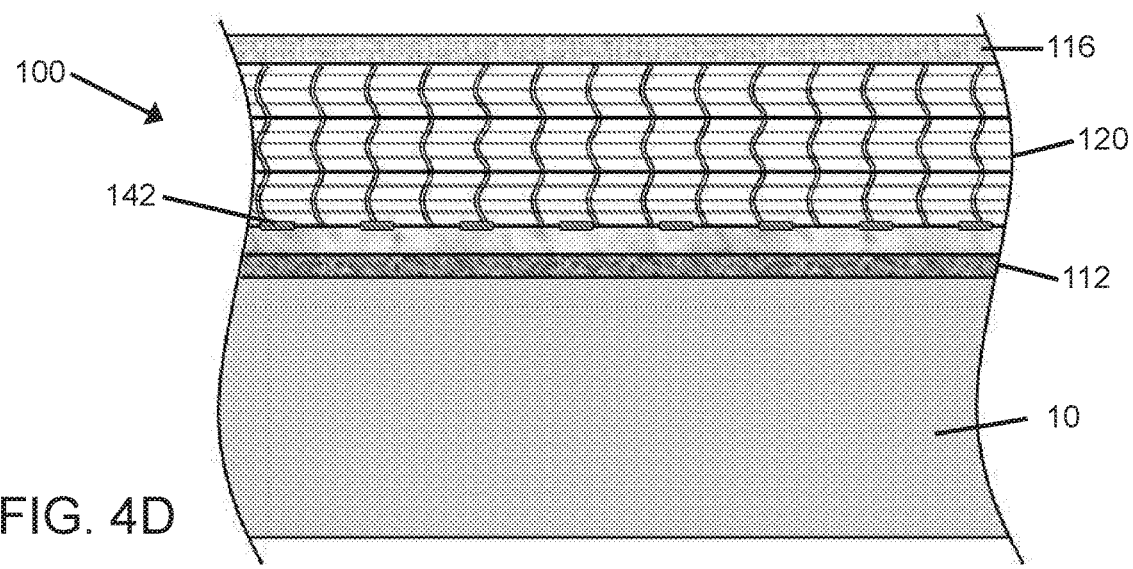
Figure 4E:
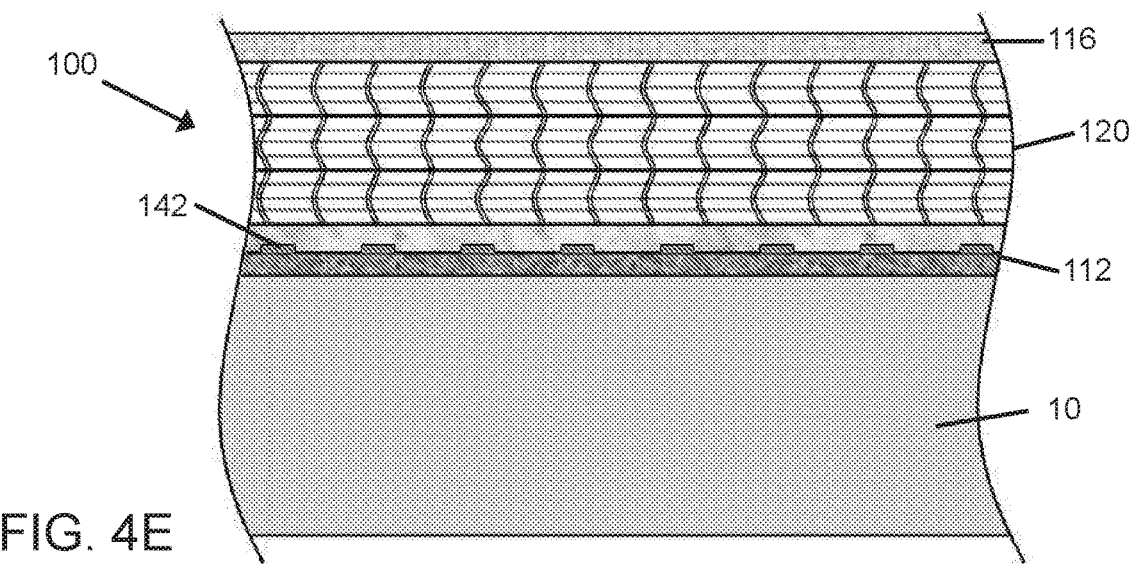
Figure 4F:
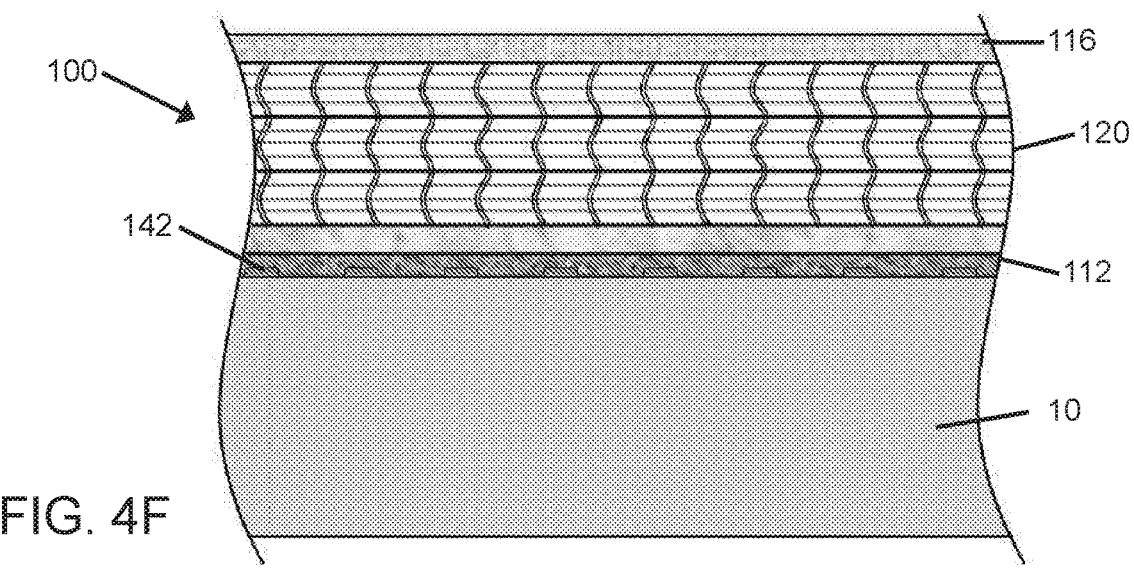

In one embodiment, as shown in FIG. 4F, the conductive filler material (130) may be mixed with the base coating (112), and the conductive network (140) is disposed on the surface of the structure such that the conductive network (140) is directly in contact with the ESD layer. Alternatively, as shown in FIGS. 4D and 4E, the conductive filler material (130) may be mixed with the base coating (112) or polymer resin composition (114), and the conductive network (140) is disposed on the base coating (112) such that the conductive network (140) is directly in contact with the ESD layer. In another alternative example, as shown in FIG. 4A, the conductive filler material (130) may be mixed with the polymer resin composition (114) or the top coating (116), and the conductive network (140) is disposed on the reinforcing ply stack (120) such that the conductive network (140) is directly in contact with the ESD layer. In further embodiments, example, as shown in FIGS. 4B and 4C, the conductive filler material (130) may be mixed with the polymer resin composition (114), and the conductive network (140) is disposed within the reinforcing ply stack (120), e.g. layered between two fabric plies, such that the conductive network (140) is directly in contact with the ESD layer.

In other embodiments, the conductive filler material (130) may be an ESD layer juxtaposed between at least two layers of the FRP composite. Preferably, the conductive network (140) is disposed between the same two layers of the FRP composite such that the conductive network (140) is directly in contact with the ESD layer. In one embodiment, the ESD layer may be a thin layer of conductive powder substantially covering a surface of one layer. For example, the conductive powder may be applied on the surface of the outermost fabric ply to form the ESD layer, and the conductive network (140) is installed on the ESD layer, after which the top coating (116) is applied. As another example, the conductive powder may be applied on the surface of the base coating (112) to form the ESD layer, and the conductive network (140) is installed on the ESD layer, after which a fabric ply is applied.

According to one embodiment, the conductive network (140) may comprise a conductive metal in the form of a tape, ribbon, or wire. Said conducting metal may be connected to a ground wire. In some embodiments, the conductive metal tape, wire, or other conductive substrate are divided into strips and arranged in a grid pattern. Each grid of the grid pattern can have a length and width that is calculated based on the conductivity of the surface exposed to static electricity. For example, the system may be set in a grid based on a conservative configuration, and knowing that static would not travel far before hitting the "tie to ground source". However, it is understood that the spacing is not a fixed requirement for the system and may be determined based on specific structural and conductivity requirements. The conductive "tie to ground" can be anything that is conductive and can be bonded over using a polymer from the system of the present invention.

Figure 5A:
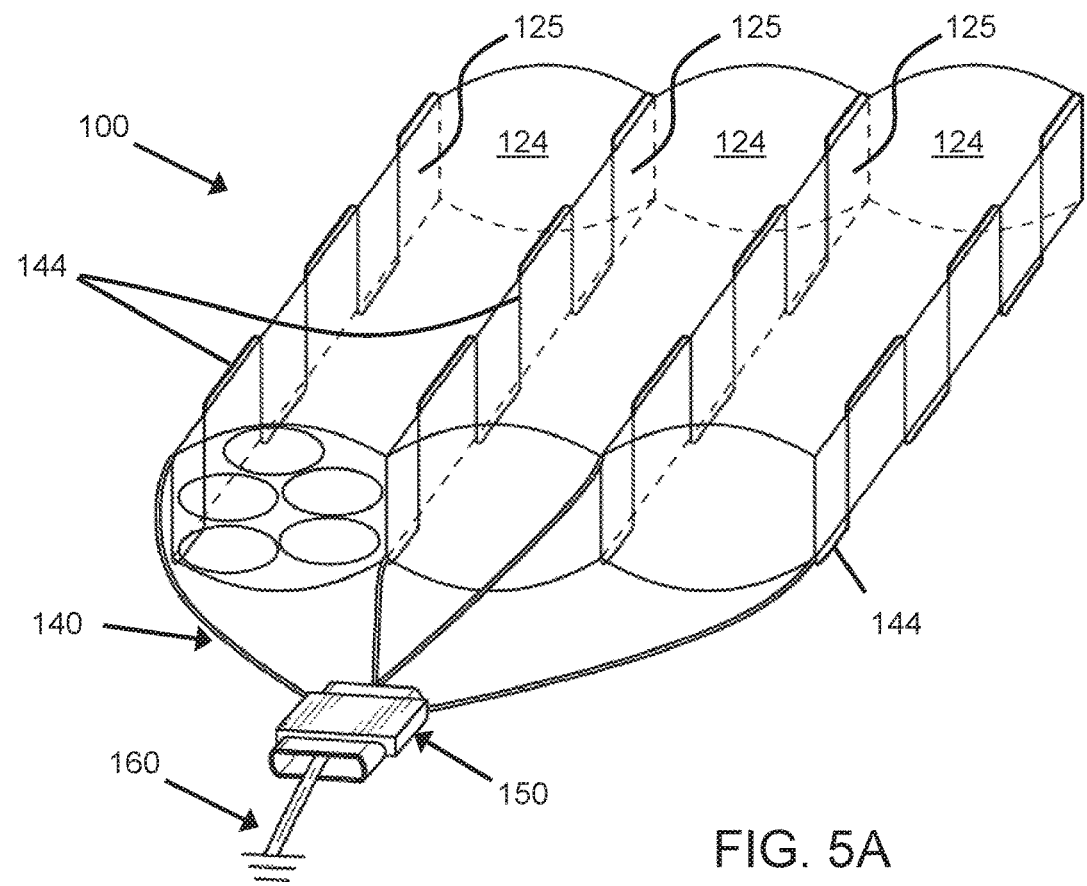
FIGS. 5A-5B show non-limiting embodiments of the FRP composite in which the conducting network is a component of a reinforcing fabric ply.
Figure 5B:
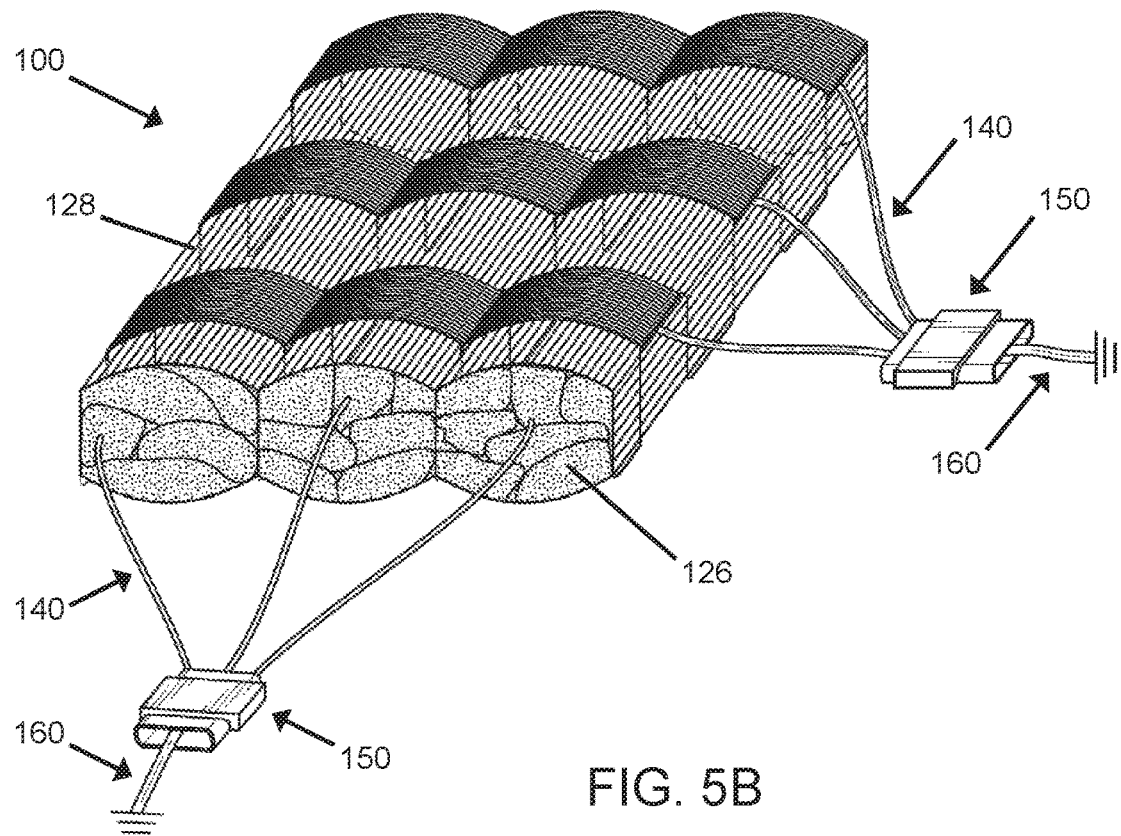

In an alternative embodiment, the conductive network (140) may comprise conductive thread (144) used for stitching together the pocket seam edge (125) of two neighboring pockets (124), as shown in FIG. 5A. In yet another alternative embodiment, the pockets (124) or filaments (128) may be constructed from a conductive material such as carbon fiber, copper, silver, steel and aluminum. Without wishing to limit the invention to a particular theory or mechanism, with this conductive material of construction, the pockets (124) or filaments (128) can effectively form the conductive network (140), as shown in FIG. 5B.

In one embodiment, the system may be disposed on a structure, such as a structure that may require repair or reinforcement. Further still, the structure may be prone to accumulating static and electrostatic explosions. Examples of said structures may include, but are not limited to, elevator grain pipes, tanks and vessels, grain and coal silos, hoppers and containers, grain chutes, or any other structure where friction from media interfacing with the surface causes electrostatic energy that can result in an explosion. In another embodiment, the structures may be constructed from concrete, steel, masonry, wood, plastic, an insulative material, or any other material that can accumulate static.

Since the system may be used to reinforce and dissipate static from a structure, the present invention also provides for methods of reinforcing and dissipating static from the structure. In one embodiment, the method may comprise providing any one of the reinforcing and electrostatic dissipative systems described herein, attaching said system to an outer surface of the structure, and connecting the grounding component to a ground source.

According to another embodiment, the method may comprise providing a fiber reinforced polymer (FRP) composite (110) comprising a base coating (112); one or more reinforcing fabric plies (122), each fabric ply (122) comprising a plurality of linear pockets (124) aligned in parallel, where each pocket (124) is stitched lengthwise to its neighboring pockets (124) at a pocket seam edge (125), and a fiber tow (126) comprising a plurality of filaments (128) collected into a bundle and disposed lengthwise in each pocket (124); a polymer resin composition (114); and a top coating (116). The method may further comprise providing a conductive filler material (130); providing conductive wiring or tape (142); providing a connection clip (150) and a grounding component (160); preparing the structure (10) for application of the FRP composite (110); mixing the conductive filler material (130) with the top coating (116); applying the base coating (112) to a surface (15) of the prepared structure (10); applying the one or more reinforcing fabric plies (122) over the prepared structure (10) by laying the fabric ply (122) on the base coating (112) and applying and saturating the fabric ply (122) with the polymer resin composition (114); applying the conductive wiring or tape (142) on an outermost layer of fabric ply (122) to form a conductive network (140); applying the top coating (116) having the conductive filler material (130) on the outermost layer of fabric ply (122) and the conductive network (140); connecting the conductive network (140) to the grounding component (160) via the connection clip (150), thus forming a reinforcing and ESD composite system; and connecting the grounding component (160) to a ground source. In some embodiments, the conductive wiring or tape (142) may be divided into strips and arranged in a grid pattern (145).

According to yet another embodiment, the method may comprise providing an FRP composite (110) comprising a base coating (112); one or more reinforcing fabric plies (122), each fabric ply (122) comprising a plurality of linear pockets (124) aligned in parallel, where each pocket (124) is stitched lengthwise to its neighboring pockets (124) at a pocket seam edge (125), and a fiber tow (126) comprising a plurality of filaments (128) collected into a bundle and disposed lengthwise in each pocket (124); a polymer resin composition (114); and a top coating (116). The method may further comprise providing a conductive filler material (130); providing conductive wiring or tape (142); providing a connection clip (150) and a grounding component (160); preparing the structure (10) for application of the FRP composite (110); mixing the conductive filler material (130) with at least one of the base coating (112), the polymer resin composition (114), or the top coating (116); applying the base coating (112) to a surface (15) of the prepared structure (10); applying the one or more reinforcing fabric plies (122) over the prepared structure (10) by laying the fabric ply (122) on the base coating (112), and applying and saturating the fabric ply (122) with the polymer resin composition (114); applying the top coating (116) on an outermost layer of fabric ply (122); installing the conductive wiring or tape (142) to form a conductive network (140) such that the conductive wiring or tape (142) is disposed between at least one layer of the FRP composite (110) and is directly in contact with the conductive filler material (130) mixed with the base coating (112), the polymer resin composition (114), or the top coating (116); connecting the conductive network (140) to the grounding component (160) via the connection clip (150), thus forming a reinforcing and ESD composite system; and connecting the grounding component (160) to a ground source. In other embodiments, the conductive wiring or tape (142) may be divided into strips and arranged in a grid pattern (145).

In one embodiment, the conductive filler material (130) may be mixed with the base coating (112) to form an ESD layer, and the conductive network (140) may be disposed on the surface (15) of the prepared structure (10) such that the conductive network (140) is directly in contact with the ESD layer. In another embodiment, the conductive filler material (130) may be mixed with the base coating (112) or polymer resin composition (114) to form an ESD layer, and the conductive network (140) may be disposed on the base coating (112) such that the conductive network (140) is directly in contact with the ESD layer. In a further embodiment, the conductive filler material (130) may be mixed with the polymer resin composition (114) or the top coating (116) to form an ESD layer, and the conductive network (140) may be disposed on the outermost layer of fabric ply (122) such that the conductive network (140) is directly in contact with the ESD layer.

According to a further embodiment, the method may comprise providing a fiber reinforced polymer (FRP) composite (110) comprising a base coating (112); one or more reinforcing fabric plies (122), each fabric ply (122) comprising a plurality of linear pockets (124) aligned in parallel, where each pocket (124) is stitched lengthwise to its neighboring pockets (124) at a pocket seam edge (125), a fiber tow (126) comprising a plurality of filaments (128) collected into a bundle and disposed lengthwise in each pocket (124), and a conductive network (140); a polymer resin composition (114); and a top coating (114). The method may also comprise providing a conductive filler material (130); providing a connection clip (150) and a grounding component (160); preparing the structure (10) for application of the FRP composite (110); mixing the conductive filler material (130) with at least one of the base coating (112), the polymer resin composition (114), or the top coating (116); applying the base coating (112) to a surface (15) of the prepared structure (10); applying the one or more reinforcing fabric plies (122) over the prepared structure (10) by laying the fabric ply (122) on the base coating (112) and applying and saturating the fabric ply (122) with the polymer resin composition (114); applying the top coating (116) on an outermost layer of fabric ply (122); connecting the conductive network (140) to the grounding component (160) via the connection clip (150), thus forming a reinforcing and ESD composite system; and connecting the grounding component (160) to a ground source.

In one embodiment, the conductive network (140) may comprise conductive thread (144) used for stitching together the pocket seam edge (125) of two neighboring pockets (124). In another embodiment, the pockets (124) or filaments (128) may be constructed from the conductive material, thus effectively forming the conductive network (140). In a preferred embodiment, the conductive material may be carbon fiber, copper, silver, steel, or aluminum.

In another embodiment, the step of preparing the structure may comprise cleaning the structure. In addition, cracks in the structure may be patched or the surface re-leveled. For instance, loose particles, scale, surface oxidation, and oily films may be removed via physical abrasion or power washing.

In further embodiments, the step of layering the one or more reinforcing fabric plies (122) over the prepared structure (10) may further comprise laying the fabric ply (122) on a previous layer of saturated fabric ply (122), applying and saturating the overlying fabric ply (122) with the polymer resin composition (114), and repeating said steps until a desired thickness of stacked reinforcing fabric plies (122) is achieved. For example, the steps may be repeated as needed so as to form a stack of reinforcing fabric plies (122) ranging from about 2 to 10 plies in the stack. The thickness can also vary from 0.5-3 inches.

In some embodiments, the grounding component (160) may comprise at least one ground wire, connected to the conductive network (140) via a connection clip (150). In other embodiments, the step of connecting the grounding component (160) to a ground source, such as an environmental ground, may comprise burying the ground component underground, e.g. in soil or dirt.

Without wishing to bind the invention to a particular theory or mechanism, the methods described herein effectively allows for the FRP composite (110) to reinforce the structure when the polymer resin composition (114) is cured. Furthermore, the conductive filler material (130) imparts ESD properties in the FRP composite (110), thus effectively dissipating static from the structure (10) and the FRP composite (110) to the grounding component (160) via the conductive network (140), thereby reducing a risk of static ignition. Preferably, the system (100) can have a resistivity in a static dissipative range of about $1.0 \times 10^4$ to $<1.0 \times 10^{11}$ ohms, per ANSI ESD S541 Resistance Classification, which falls in the static dissipating range.

As used herein, the term "about" refers to plus or minus 10% of the referenced number.

The disclosures of the following U.S. patents are incorporated in their entirety by reference herein: U.S. Pat. Nos. 8,696,849 and 9,307,796.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of reinforcing and dissipating static from a structure (10), said method comprising:
   a. providing a fiber reinforced polymer (FRP) composite (110) designed for strengthening and structural reinforcement, said FRP composite comprising:
      i. a base coating (112);
      ii. one or more reinforcing fabric plies (122), each fabric ply (122) comprising a plurality of linear pockets (124) aligned in parallel, wherein each pocket (124) is stitched lengthwise to its neighboring pockets (124) at a pocket seam edge (125); and a fiber tow (126) comprising a plurality of filaments (128) collected into a bundle, wherein the fiber tow (126) is disposed lengthwise in each pocket (124);
      iii. a polymer resin composition (114); and
      iv. a top coating (116);
   b. providing a conductive filler material (130);
   c. providing conductive wiring or tape (142);
   d. providing a connection clip (150) and a grounding component (160);
   e. preparing the structure (10) for application of the FRP composite (110);
   f. mixing the conductive filler material (130) with the top coating (116);
   g. applying the base coating (112) to a surface (15) of the prepared structure (10);
   h. applying the one or more reinforcing fabric plies (122) over the prepared structure (10), comprising:
      i. laying the fabric ply (122) on the base coating (112); and
      ii. applying and saturating the fabric ply (122) with the polymer resin composition (114);
   i. applying the conductive wiring or tape (142) on an outermost layer of the fabric ply (122), wherein the conductive wiring or tape (142) is divided into strips and arranged in a grid pattern (145) to form a conductive network (140);
   j. applying the top coating (116) having the conductive filler material (130) on the outermost layer of fabric ply (122) and the conductive network (140);
   k. connecting the conductive network (140) to the grounding component (160) via the connection clip (150), thus forming a reinforcing and electrostatic dissipative (ESD) composite system; and
   l. connecting the grounding component (160) to a ground source;
      wherein the FRP composite (110) strengthens and reinforces the structure (10) when the polymer resin composition (114) is cured, wherein the conductive filler material (130) is effective for dissipating static from the structure (10) and the FRP composite (110) to the grounding component (160) via the conductive network (140), thereby reducing a risk of static ignition.

* * * * *